(12) United States Patent
Urban et al.

(10) Patent No.: US 12,236,621 B2
(45) Date of Patent: Feb. 25, 2025

(54) METHOD FOR HEAD IMAGE REGISTRATION AND HEAD MODEL GENERATION AND CORRESPONDING DEVICES

(71) Applicant: Carl Zeiss Vision International GmbH, Aalen (DE)

(72) Inventors: Steffen Urban, Jena (DE); Christian Achilles, Jena (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/798,862

(22) Filed: Aug. 9, 2024

(65) Prior Publication Data

US 2024/0404086 A1 Dec. 5, 2024

Related U.S. Application Data

(63) Continuation of application No. PCT/EP2023/053506, filed on Feb. 13, 2023.

(30) Foreign Application Priority Data

Feb. 14, 2022 (EP) .................................... 22156626

(51) Int. Cl.
*G06T 7/33* (2017.01)
*G06T 7/73* (2017.01)
(Continued)

(52) U.S. Cl.
CPC ................ *G06T 7/337* (2017.01); *G06T 7/73* (2017.01); *G06T 15/04* (2013.01); *G06T 17/20* (2013.01);
(Continued)

(58) Field of Classification Search
CPC .......... G06T 7/337; G06T 7/73; G06T 17/20; G06T 3/147; G06T 3/14; G06T 7/30; G06T 2207/10028
See application file for complete search history.

(56) References Cited

U.S. PATENT DOCUMENTS 8,126,261 B2 2/2012 Medioni et al.
10,157,477 B2 12/2018 Chen
(Continued)

FOREIGN PATENT DOCUMENTS

CN 111414798 A 7/2020
EP 2852935 B1 8/2020
(Continued)

OTHER PUBLICATIONS

"Robust Facial Landmark Detection under Significant Head Poses and Occlusion" Yu et al. arXiv:1709.08127v1 [cs.CV] Sep. 23, 2017 (Year: 2017).*
(Continued)

*Primary Examiner* — Antonio A Caschera
(74) *Attorney, Agent, or Firm* — Tautz & Schuhmacher LLC; Georg Hasselmann

(57) ABSTRACT

A head image registration uses a plurality of combined 2D and depth images, for example RGBD images, of a head recorded from different positions. Landmark points are determined for each of the combined images. The registration is performed as a coarse registration based on the landmark points followed by a fine registration based on full point clouds. Based on the registration, a head model may be generated.

13 Claims, 5 Drawing Sheets

(51) Int. Cl.
  *G06T 15/04*  (2011.01)
  *G06T 17/20*  (2006.01)
(52) U.S. Cl.
  CPC ............ *G06T 2207/10024* (2013.01); *G06T 2207/10028* (2013.01); *G06T 2207/20072* (2013.01); *G06T 2207/20221* (2013.01); *G06T 2207/30201* (2013.01); *G06T 2207/30244* (2013.01); *G06T 2210/56* (2013.01)

(56) References Cited

U.S. PATENT DOCUMENTS

| | | | |
|---|---|---|---|
| 10,326,972 | B2 | 6/2019 | Zhang et al. |
| 2015/0154199 | A1* | 6/2015 | Akman ............... G06T 17/20 707/737 |
| 2017/0280130 | A1 | 9/2017 | Burton |
| 2020/0098166 | A1* | 3/2020 | Ni ....................... G06T 19/20 |
| 2020/0142224 | A1 | 5/2020 | Schwarz et al. |

FOREIGN PATENT DOCUMENTS

| | | |
|---|---|---|
| WO | 2019008087 A1 | 1/2019 |
| WO | 2019164502 A1 | 8/2019 |

OTHER PUBLICATIONS

Fischler et al., "Random sample consensus: a paradigm for model fitting with applications to image analysis and automated cartography," Communications of the ACM, vol. 24, No. 6, pp. 381 to 395, Jun. 1981.
Besl et al., "Method for registration of 3D shapes," IEEE Transactions on Pattern Analysis and Machine Intelligence, vol. 14, No. 2, pp. 239 to 256, Feb. 1992.
Rusinkiewicz et al., "Efficient variants of the ICP algorithm," Proceedings Third International Conference on 3-D Digital Imaging and Modeling, Jun. 2001.
Belyaev et al., "A comparison of mesh smoothing methods," Israel-Korea Bi-National Conference on Geometric Modeling and Computer Graphics, vol. 2, Jan. 2003.
Lu et al., "Matching 2.5D Face Scans to 3D Models," IEEE transactions on pattern analysis and machine intelligence, vol. 28, No. 1, pp. 31 to 43, Jan. 2006.
Kazhdan et al., "Poisson surface reconstruction," Proceedings of the fourth Eurographics symposium on Geometry processing, vol. 7, No. 4, Jun. 2006.
Fidaleo et al., "Model-Assisted 3D Face Reconstruction from Video," International Workshop on Analysis and Modeling of Faces and Gestures, pp. 124 to 138, Oct. 2007.
Wu, "VisualSFM: A Visual Structure from Motion System," http://ccwu.me/vsfm/, 2011.
Perakis et al., "3D facial landmark detection under large yaw and expression variations," IEEE transactions on pattern analysis and machine intelligence, vol. 35, No. 7, pp. 1552 to 1564, Jul. 2013.
Tanskanen et al., "Life metric 3D reconstruction on mobile phones," Proceedings of the IEEE International Conference on Computer Vision, pp. 65 to 72, Dec. 2013.
Kolev, et al., "Turning mobile phones into 3D scanners," Proceedings of the IEEE Conference on Computer Vision and Pattern Recognition, pp. 1 to 8, Sep. 2014.
Waechter et al., "Let there be color! Large-scale texturing of 3D reconstructions," European conference on computer vision, vol. 8693, pp. 836 to 850, Sep. 2014.
Sweeney, "Theia Multiview Geometry Library: Tutorial & Reference," 2015 (last accessed Aug. 7, 2024).
Choi et al., "Robust reconstruction of indoor scenes," Proceedings of the IEEE conference on computer vision and pattern recognition, pp. 5556 to 5565, Jun. 2015.
Galliani et al., "Massively Parallel Multiview Stereopsis by Surface Normal Diffusion," IEEE International Conference on Computer Vision, pp. 873 to 881, Dec. 2015.
Muratov et al., "3D Capture: 3D Reconstruction for a Smartphone," IEEE Conference on Computer Vision and Pattern Recognition Workshops, pp. 75 to 82, Jun. 2016.
Schoenberger et al., "Structure-from-motion revisited," Proceedings of the IEEE Conference on Computer Vision and Pattern Recognition, pp. 4104 to 4113, Jun. 2016.
Urban et al., "Mlpnp—a real-time maximum likelihood solution to the perspective n-point problem," ISPRS Annals of the Photogrammetry, Remote Sensing and Spatial Information Sciences, pp. 131 to 138, Jul. 2016.
Nocerino et al., "A smartphone-based 3D pipeline for the creative industry-the replicate EU project," The International Archives of the Photogrammetry, Remote Sensing and Spatial Information Sciences, pp. 535 to 541, Feb. 2017.
Moulon et al., "Openmvg: Open multiple view geometry," Reproducible Research in Pattern Recognition: First International Workshop, vol. 10214, pp. 60 to 74, Apr. 2017.
Park et al., "Colored point cloud registration revisited," Proceedings of the IEEE International Conference on Computer Vision, pp. 143 to 152, Oct. 2017.
Wu et al., "Facial landmark detection with tweaked convolutional neural networks," IEEE transactions on pattern analysis and machine intelligence, vol. 40, No. 12, pp. 3067-3074, Dec. 2018.
Wu et al., "Facial landmark detection: A literature survey," International Journal of Computer Vision, vol. 127, No. 2, pp. 115 to 142, Feb. 2019.
Bagchi et al., "Reg3DFacePtCd: Registration of 3D Point Clouds Using a Common Set of Landmarks for Alignment of Human Face Images," KI—Künstliche Intelligenz, vol. 33, pp. 369 to 387, May 2019.
Guo et al., "Towards fast, accurate and stable 3D dense face alignment," Computer Vision—ECCV 2020: 16th European Conference, pp. 152 to 168, Aug. 2020.
Vyas et al., "An Efficient 3D Synthetic Model Generation Pipeline for Human Pose Data Augmentation," Proceedings of the IEEE/CVF conference on computer vision and pattern recognition, pp. 1542 to 1552, Jun. 2021.
Choe et al., "VolumeFusion: Deep Depth Fusion for 3D Scene Reconstruction," Proceedings of the IEEE/CVF International Conference on Computer Vision, pp. 16086 to 16095, Aug. 2021.
Agarwal et al., "Ceres solver," available at http://ceres-solver.org (last accessed Aug. 7, 2024).
International Standard "Robots and robotic devices," (ISO 8373:2012) German and English version, Mar. 2012.
European Search Report issued in EP 22156626.8, to which this application claims priority, mailed Sep. 5, 2022.
International Search Report and Written Opinion issued in PCT/EP2023/053506, to which this application claims priority, mailed May 8, 2023.
International Preliminary Report on Patentability issued in PCT/EP2023/053506, to which this application claims priority, mailed Apr. 25, 2024.

* cited by examiner

METHOD FOR HEAD IMAGE REGISTRATION AND HEAD MODEL GENERATION AND CORRESPONDING DEVICES

CROSS REFERENCE TO RELATED APPLICATIONS

This application is a continuation application of international patent application PCT/EP2023/053506, filed on Feb. 13, 2023 and designating the U.S., which claims priority to European patent application EP 22 156 626.8, filed on Feb. 14, 2022, both of which are hereby incorporated by reference in their entireties.

TECHNICAL FIELD

The present application relates to methods for head image registration and head model generation and to corresponding devices to execute the methods.

BACKGROUND 3D models of the head of a person, shortly referred to as "head models" herein, may be used to represent the head of the person as a so-called avatar in a variety of applications. One example for such applications is a virtual fitting and try-on of spectacle frames, as for example described in WO 2019/008087 A1.

For such applications, it is desirable that the 3D model of the head used reflects and matches the actual head of the person well, to give a correct visual impression on how the spectacle frame looks on the person.

One approach for generating a head model, realized for example in applicant's Visufit system, is to use a plurality of stationary cameras arranged around the head of the person, which may take images of the head of the person essentially simultaneously. Due to the fixed arrangement, the relative positions and orientations of the cameras are known, and the 3D model of the head may be generated based on techniques similar to triangulation. Combination of position and orientation in space is also referred to as "pose" in the relevant technical field, as for example defined in ISO 8373:2012 4.5. However, such an approach requires a stationary camera arrangement, which may be provided for example at an optician, but is hardly feasible for private use of persons.

As such, approaches where a person can use a mobile device like a smartphone or tablet PC to take images of his or her head from various directions, generate 3D models in general, optionally also a 3D model of the head of the person based on these images have been made. The drawback of these approaches are that the poses of the mobile device when capturing the images is not a priori knowledge and needs to be determined.

For example, Tanskanen, Petri, et al., "Life metric 3D reconstruction on mobile phones," Proceedings of the IEEE International Conference on Computer Vision, 2013, discloses a life metric 3D reconstruction for example of statues in a museum, where a pose estimation of the mobile phone is performed using inertial tracking by an accelerometer and/or gyroscope provided in the mobile phone.

Kolev, Kalin, et al., "Turning mobile phones into 3D scanners," Proceedings of the IEEE Conference on Computer Vision and Pattern Recognition, 2014, uses a camera motion tracking system to provide camera poses.

Muratov, Oleg, et al., "3D Capture: 3D Reconstruction for a Smartphone," also uses an inertial measurement unit for tracking camera poses.

These approaches rely on the accuracy of acceleration and similar measurements to provide camera poses, from which 3D models can be calculated.

U.S. Pat. No. 8,126,261 B2 which is not specifically directed to smartphones and similar mobile devices, uses a processing based on prior knowledge of a generic face.

WO 2019/164502 A1 discloses generating 3D models of a head using a smartphone based on 2D images using 3D mesh representations. This method is computationally expensive, and the document proposes, as a possibility, to perform the calculations on a remote server.

In recent times, besides a conventional camera, smartphones also have been equipped with a depth sensor which are able to measure the distance from the smartphone to an object, for example, the face, with a certain spatial resolution. The combination of a conventional 2D camera with such a depth sensor is also referred to as RGBD camera (RGB for red, green, blue, i.e., the principal colors used by a 2D image sensor, and D for depth). In other approaches, a depth camera may be provided separately from a smartphone.

U.S. Pat. No. 10,157,477 B2 discloses generating a 3D model of the head using such an RGBD camera. In the introductory portion, this document discusses using facial landmark tracking and regards this method as inaccurate and disadvantageous. Other methods are also discussed. Then the document proposes a method which relies on calculating at least two head meshes from different perspectives and determine a translation and rotation or, in other words, a registration between the head meshes. Based on this, the poses of the camera relative to the head of the person when capturing images may be determined. Registration generally refers to a transformation process between two entities (meshes, RGBD images, point clouds or the like) that transforms one of the entities into another one of the entities. Registration is necessary in order to be able to compare or integrate the data obtained from separate measurements.

In this respect, it should be noted that providing a registration between RGBD images or the corresponding head meshes taken from different camera poses is essentially equivalent to determining the camera pose itself when the way the camera transforms a 3D object into an image is known, which in turn is given by known physical properties of the camera like focal length and resolution. This is easy to understand, as for example when the camera pose is rotated with respect to the face, the images are also rotated. When the camera position is moved towards the head or further away from the head, the head becomes smaller or larger in the corresponding RGBD image, corresponding to a magnification greater or smaller than one, etc.

However, matching meshes including a plurality of vertices as in U.S. Pat. No. 10,157,477 B2 may be computationally expensive.

Vyas Katha et al: "An Efficient 3D Synthetic Model Generation Pipeline for Human Pose Data Augmentation," 2021 IEEE/CVF conference on computer vision and pattern recognition workshops (CVPRW) discloses a two step registration process between face images, where a coarse registration uses surface normals and then a fine registration uses an iterative closest point algorithm.

Xiaoguang Lu et al., "Matching 2.5D Face Scans to 3D Models," IEEE transactions on pattern analysis and machine intelligence, IEEE computer society, USA, vol. 28 no. 1, 2006, CN 111 414 798 and Bagchi Parama et al.:

"Reg3DFacePtCd: Registration of 3D Point Clouds Using a Common Set of Landmarks for Alignment of Human Face Images," KI. Künstliche Intelligenz, Arendtap Desktop Publishing, Bremen, vol. 33 no. 4, 2019, each disclose a method where a point cloud of a face, in particular RGBD images, are registered to a 3D model of a head using a two step process with a coarse registration using landmarks and a fine registration using ICP.

SUMMARY

It is an object of the disclosure to provide an improved approach for image registration of images taken by an RGBD camera, and, based on this, corresponding methods and devices for generation of a 3D model of a head of a person.

According to several aspects of the present invention, a method for head image registration is provided, comprising:
  providing a plurality of combined 2D and depth images of a head captured from different positions,
  determining landmark points for each of the combined 2D and depth images, and
  performing a pairwise coarse registration between pairs of combined 2D and depth images based on the landmark points.

The method is characterized by, after the pairwise coarse registration, performing a fine registration of the coarse registered combined 2D and depth images based on full point clouds represented by the combined 2D and depth images.

The coarse registration only with landmark points can be advantageously performed with comparatively low computational complexity. Furthermore, as a coarse registration has already been performed, also the fine registration using the full point clouds may be performed with lower computational complexity and/or higher precision compared to a case as for example in the U.S. Pat. No. 10,157,477 B2 discussed above where only complete head meshes are used for registration.

Terms used above will be explained in the following.

A combined 2D and depth image refers to a 2D image and a depth image taken from the respective position essentially simultaneously. The 2D image may be a color image like an RGB image (red, green, blue) or may also be a grayscale image. A depth image provides a map of distances of the camera to the object, in this case the head. An example of a combined 2D and depth image can be a RGBD image. For capturing the 2D part of the combined image, any conventional image sensor, combined with corresponding camera optics may be used. To capture depth images, also any conventional depth sensor like a time-of-flight sensor may be used. The combined image may include two separate files or other data entities, where in one data entity for each 2D coordinate, e.g., pixel, a greyscale value or color value is given, and in another data entity for each 2D coordinate a depth value is given. The combined image may also include only a single data entity, where for each 2D coordinate both greyscale/color information and depth information is given. In other words, the way the information is stored in data entities like files is not important as long as for the scene captured in the image both greyscale/color information and depth information is available. A camera adapted for capturing combined 2D and depth images, in this case color images, is also referred to an RGBD camera (red, green, blue, depth). As mentioned in the introductory portion, some modern smartphones or other mobile devices are equipped with such RGBD cameras. In other cases, as also explained in the introductory portion, also an RGBD camera or a depth sensor (which is then used together with a built-in camera of the smartphone) may be attached to a smartphone. It should be noted that the depth image need not have the same resolution as the 2D image. In such a case, a scaling operation may be performed (downscaling or upscaling) to adapt the resolution of the 2D and depth images to each other. The result is essentially a point cloud where each point has a 3D coordinate based on the 2D coordinates in the image and a depth coordinate from the depth sensor, as well as a pixel value (color or grayscale value).

The phrase "captured from different positions" indicates that a relative position between head and device used for capturing the combined 2D and depth images changes from image to image. For example, when a smartphone is used, the smartphone may be held in a fixed position and the head may be moved, for example rotated, or the smartphone may be moved around the head. The smartphone or other mobile device used (e.g., tablet PC) may provide corresponding instructions to the person, i.e., to move the head relative to the smartphone. As with any approach relying on human interaction, errors may result if the person does not follow the instructions.

Image registration generally relates to the process of finding a transformation which transforms one of the combined 2D and depth images to another one of the combined 2D and depth images. Such a transformation may include a rotation component, a translation component and a magnification component (magnification greater or smaller than one) and may be written in matrix form. As mentioned initially, performing the registration by determining the above-mentioned transformation is essentially equivalent to determining the (relative) camera poses (positions and orientation) from which the combined images were captured, as by the properties of the cameras like focal length of the optics and resolutions for a certain pose a certain combined image of the head results.

A landmark point is a predefined point on the head. Such landmark points may for example include the tip of the nose, points on the nose bridge, corners of the mouth or of the eyes, points describing the eyebrows and the like. Such landmark points in the combined 2D and depth images may be determined by various conventional means. For example, a trained machine learning logic like a neural network may be used to determine the landmark points. In this case, for training, a number of combined 2D and depth images from different positions and for a plurality of different heads are used as training data, where the landmark points may be manually annotated. After training, the trained machine learning logic determines the landmark points. Details may be found for example in Wu, Y., Hassner, T., Kim, K., Medioni, G., & Natarajan, P. (2017), "Facial landmark detection with tweaked convolutional neural networks," IEEE transactions on pattern analysis and machine intelligence, 40 (12), 3067-3074, Perakis, P., Passalis, G., Theoharis, T., & Kakadiaris, I. A. (2012), "3D facial landmark detection under large yaw and expression variations," IEEE transactions on pattern analysis and machine intelligence, 35 (7), 1552-1564, or Wu, Y., & Ji, Q. (2019), "Facial landmark detection: A literature survey. International Journal of Computer Vision," 127 (2), 115-142 (2018). Landmark detection may be preceded by a segmentation, where, for example, the background is separated from the face, and the face is segmented to provide face segments. The landmarks may then be extracted from the face segments.

The pairwise coarse registration provides a coarse alignment between the 3D landmarks of the pairs. In exemplary embodiments, this pairwise coarse registration estimates a transformation matrix between the landmarks of the two combined images that aligns the landmarks in a least square sense, i.e., that the error $e=\|L_i^{j=1}-T_1{}^2L_i^{j=2}\|^2$ is minimized, where $L_i^j$ is the i-th landmark of the j-th image and $T_1{}^2$ is a transformation matrix from a second image of the respective pair (j=2) to the first image of the respective pair (j=1). This coarse registration may be performed by a method called point to point ICP ("Iterative Closest Point"), which is for example described in Besl, Pazl J. and Mckay, Neil D, "Method for registration of 3D shapes," Sensor fusion IV: control paradigms and data structures, Vol. 1611, International Society for Optics and Photonics, 1992. Typically, to eliminate potential outliers which may be generated in the landmark determining step, a random sampling consensus procedure may be used, as described in Fischler, Martin A., and Bolles, Robert C., "Random sampling consensus: a paradigm for model fitting with applications to image analysis and automated cartography," Communications of the ACM 24.6 (1981): 381-2395. The above and other formula presented herein use so-called homogeneous coordinates, as frequently done the case in computer vision applications. This means that transformations T are represented as 4×4 matrices [Rt; 0 0 0 1], with a 3×3 rotation matrix R, a translation vector t and the last row being 0 0 0 1. 3D point (x, y, z) are augmented with a homogeneous component w, i.e., (x, y, z, w), where usually w=1. This makes it possible to include translation and rotation in a single matrix multiplication, i.e., instead of x2=R x1+t, with x2 and x1 vectors in Cartesian coordinates, one can write x2w=T x1w, where x1w and x1w are corresponding vectors in homogeneous coordinates. Nevertheless, this is merely a matter of notation, and the same calculations may also be performed in cartesian or other coordinates.

The fine registration refines the above-mentioned transformations, i.e., makes the transformations more precise. For this fine registration, full point clouds represented by the combined 2D and depth images (i.e., the full RGBD images or point clouds derived therefrom) may be used. In particular, also color information may be used. As a coarse registration already has been performed, the fine registration may be performed more efficiently than in cases where only the point cloud is used for registration, or a corresponding mesh is used.

Different approaches may be used for fine registration. In a first particular aspect, typically also in other aspects, the approach selected may depend on the geometrical difference, i.e., the error remaining after the coarse registration, for example the above-mentioned error e or other error quantity like angle or position difference between the landmark points of the respective pairs of combined 2D and depth images based on the transformation determined after coarse registration. For example, also an angle difference or position difference may be used. If this deviation, (for example error e below a value, angle difference between below a threshold angle like 5°, or position difference below a position threshold like 5 cm, for example as an average for the landmark points), RGBD odometry may be used for fine registration, where not only the depths coordinate but also the color of the points of the point cloud is considered. RGBD odometry is for example described in Park, Jacsik, Zhou, Quian-Yi and Koltun, Vladlen, "Colored point cloud registration revisited," Proceedings of the IEEE International Conference on Computer Vision 2017. For larger differences a point to plane ICP on the point clouds may be used to register the images, as described for example in Rusinkiewicz, Szymon, and Levoy, Marc, "Efficient variants of the ICP algorithm," Proceedings of the third international conference on 3D digital imaging and modeling, IEEE 2001.

For both alternatives, typically the registration is performed two times, once for estimating a transformation from a first combined image of the respective pair to a second combined image of the respective pair and once for estimating a transformation from the second combined image to the first combined image, with slightly different start values for the algorithm. This may help to increase overall accuracy. In other words, $T_1{}^2$ and $T_2{}^1$ are determined. The error between the two registrations $T_e=T_1{}^2T_2{}^1$ is determined, which, if the registration is stable, should be close to an identity $I_4$ (i.e., a diagonal matrix with only values of one). If the error, i.e., deviation from identity, is below a certain threshold, the respective transformation may be added to a so-called pose graph as an average between the respective combined images. In some exemplary embodiments, covariances $\Sigma_i^j$ of the transformations may also be determined.

In a second particular aspect, typically also in other aspects, for both coarse and fine registration, not all possible pairs of combined 2D and depth images are used, but the pairs to be registered may be determined based on a classification of the combined 2D and depth images with respect to a direction relative to the head from which they are captured, for example based on a so-called putative matching graph which indicates for which pairs a registration may be performed. This may be done using approximate pose data or other approximate information to determine combined images for which the poses from which they are captured are similar enough such that a registration is reasonably possible. For example, if one combined image is taken from the left side of the head and another combined image is captured from the right side of the head, there are hardly any common landmark points to be obtained from both combined images (for example left eye only visible from the left side, right eyep only visible from the right side, the same for left mouth corner and right mouth corner). Therefore, classification may divide the combined images into categories like left, right, up and down starting from a frontal image. Inside each category, the pairwise coarse and fine registration as described above is performed.

The categorization in some exemplary embodiments may be based on metric data from the image recording device itself, for example from ARKit tools in case of iOS-based devices or ARCore tools in case of Android based devices used for capturing the combined images. In other cases, the putative matching graph may be derived from the above landmarks via 2D/3D correspondences and a perspective n-point solver, as for example described in Urban, Steffen, Leitloff, Jens and Hinz, Stefan, "MIpnp—a real-time maximum likelihood solution to the perspective n-point problem," arXiv preprint arXiv: 1607.08112 (2016).

In this way, the method may avoid attempting to register combined images for which such a registration is difficult or impossible due to lack of common landmark points which improve robustness.

Based on the registration, i.e., the transformations above, then poses may be estimated for each combined image in a global reference system. The poses may be poses of the head represented by the combined images or camera poses. As explained above, the poses of the camera when capturing the combined images are directly linked to registration of the images and therefore to the poses of the head in the combined images, such that if the camera pose is known, the head pose can be determined and vice versa. This pose graph typically is then optimized. A possible method for pose graph optimization including generating poses $M_j$ for each of the combined images, based on the registration, is described in Choi, Sungjoon, Zhou, Qian-Yi and Vladlen Koltun, "Robust reconstruction of indoor scenes, proceedings of the IEEE conference on computer vision and pattern recognition, 2015.

Based on these poses $M_j$ a pose graph p={M, e} is provided, consisting of nodes M, i.e., the poses $M_j$ and edges E, which are the transformations $T_i^{\ j}$ and possible covariances $\Sigma_i^{\ j}$ if these are determined.

Based on this pose graph, in a third particular aspect, typically also in other aspects, for further optimization then a so-called edge pruning is performed. This may serve to remove wrong estimates of $T_i^{\ j}$ to determine if the poses were estimated from valid edges, i.e., valid transformations obtained in the registration. For this, one of the poses is taken as a reference. Then, edges of the pose graph are concatenated from an unoptimized pose graph along a shortest path to another node. This obtains a further pose estimate for the node to be tested. This further estimate is then compared to the pose from the optimized pose graph. In case of a high deviation in this comparison, i.e., deviation above a threshold, the corresponding edges may be identified as erroneous. These edges may then be removed. Following this, the pose graph optimization mentioned above is repeated without the removed edges, until no more erroneous edges remain in the graph. In other words, the pruning in the third aspect, typically also in other aspects, comprises optimizing the pose graph, and comparing a pose of an optimized pose graph with an odometry based pose generated based on one or more edges of the pose graph.

According to a further aspect, a method for head model generation is provided, comprising: performing the method for head image registration as described above, and generating the head model based on the registration.

Head model, in this respect, refers to a three-dimensional representation of the head, which may be in the form of a voxel cloud or a 3D mesh with points linked by edges.

This generating of the head model may include fusing the point clouds represented by the combined images to a final point cloud by transforming them with the respective poses. For a point clouds $X_i^{\ j}$, the fused point $X_{fused}$ may be determined by $X_{fused} = U_{j=1}^{\ J} M_j X_i^{\ j}$, wherein U is an operator combining all individual transformed point clouds. This point cloud may be then thinned out by keeping only one point per voxel with a predefined side length of v, for example v=1 mm. That is, if there is more than one point per voxel from different transformed point clouds, all but one are removed. This reduces the number of points and therefore makes further processing of the fused point cloud easier.

Typically, then for obtaining the head model, based on the fused point cloud a mesh extraction is performed, i.e., based on the point cloud a mesh is generated. This may be performed using Poisson reconstruction, as described for example in Kazhdan, Michael, Bolitho, Matthew and Hoppe, Hugues, "Poisson surface reconstruction," Proceedings of the fourth Eurographics symposium on Geometry processing, Vol. 7, 2006. Due to noise, the mesh may have some uneven surface elements. To remove such an effect, in exemplary embodiments the mesh is smoothed for a couple of iterations using for example a Laplacian or Taubin smoothing, as described for example in Belyaev, Alexander and Yutaka, Ohtake, "A comparison of mesh smoothing methods," Israel-Korea Bi-national conference on geometric modeling and computer graphics, Vol. 2, 2003.

Optionally, in some exemplary embodiments the landmark points mentioned above are applied to the mesh, as for some applications it is helpful to have 3D landmarks on the head like eyes, ear points or nose points, for example for virtual try-on of spectacle frames. In some exemplary embodiments, the landmarks may be taken from one of the combined images as determined above, with the corresponding coordinated translation according to the registration applied. In other exemplary embodiments, to obtain a higher precision, 3D landmarks may be obtained by triangulations based on estimated camera poses.

Furthermore, in some exemplary embodiments the model may be provided with a normalized coordinate system, for example with the z-axis pointing upwards in the vertical direction. For this, the 3D landmarks mentioned above may be used, as generally for heads various landmarks like nose points, eyes, mouth etc. have a certain directional relationship.

Finally, the head model is textured, based on the images. A possible approach for doing so is disclosed in Waechter, Michael, Moehrle, Nils and Goesele, Michael, "Let there be color! Large-scale texturing of 3D reconstructions," European conference on computer vision, Springer, Cham, 2014.

The head model may then be used as an avatar for a virtual try-on of spectacle frames or for any other purpose where a head model is conventionally used.

Corresponding devices, for example smartphones or tablet PCs are configured, accordingly, and computer programs are also provided. For example, a computer program for a mobile device including a processor, a 2D camera, and a depth sensor is provided, wherein the computer program, when run on the processor, causes execution of any of the methods described above. The computer program may be provided on a tangible storage medium like a memory, a hard disk, a DVD or the like, or may be transmitted as a data carrier signal.

Furthermore, according to further aspects a device is provided, comprising a processor configured to:
  receive a plurality of combined 2D and depth images of a head captured from different positions, determine landmark points for each of the combined 2D and depth images, and
  perform a pairwise coarse registration between pairs of combined 2D and depth images based on the landmark points,
characterized in that the processor is further configured to:
  after the coarse registration, perform a fine registration of the coarse registered combined 2D and depth images based on full point clouds represented by the combined 2D and depth images.

The device may further comprise a camera and a depth sensor configured to capture the combined 2D and depth images.

The above explanations for the method also apply to the device, and the device may be configured to execute any of the methods above by configuring, e.g., programming, the processor accordingly, and is configured to execute the method according to one of the first to third particular aspects discussed above.

BRIEF DESCRIPTION OF THE DRAWINGS

Exemplary embodiments will be discussed with reference to the attached drawings, wherein.

DESCRIPTION OF EXEMPLARY EMBODIMENTS

Figure 1:
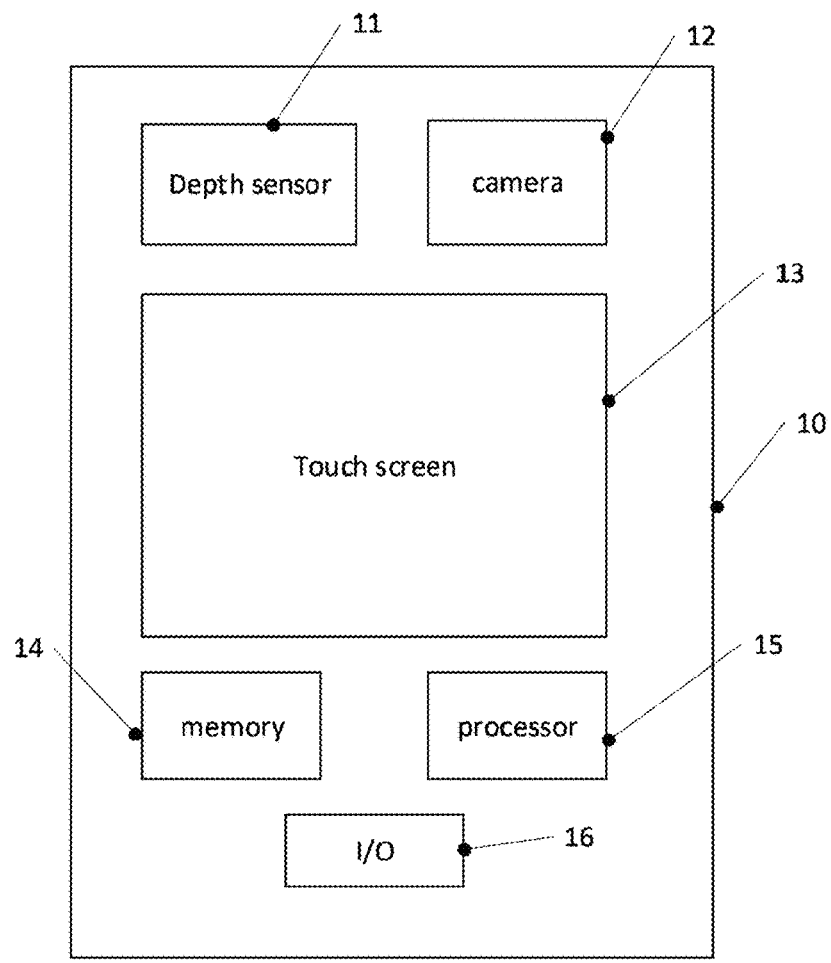
FIG. 1 is a schematic block diagram of a device according to an exemplary embodiment.

In the following, exemplary embodiments related to the generation of a 3D model of a head using a device like a smartphone or a tablet PC will be described. FIG. 1 shows a block diagram of a device 10 usable in some exemplary embodiments. Device 10 may be a smartphone or a tablet PC, but may also be a dedicated device. In case of a smartphone or tablet PC, the device is programmed accordingly to perform the methods as discussed herein.

Device 10 includes a camera 12 and a depth sensor 11. Depth sensor 11 and camera 12 form a RGBD camera as discussed above. Furthermore, device 10 includes a touchscreen 13, a processor 15, memory 14 and input/output interface(s) 16. Touchscreen 13 may serve to control device 10 and may also serve to output instructions to a person, for example to output instructions to capture the images as explained below with respect to FIG. 2. Processor 15 executes instructions stored in memory 14 to implement methods as discussed below. Input/output interfaces 16 may provide communication into a network like the Internet, for example to transmit the generated head model to other computer devices, and may also include further devices for communicating with a user, like a loudspeaker or a microphone. Generally, FIG. 1 only shows some components which may be used for methods as discussed herein, and other components may be provided, as in conventional smartphones or tablet PCs.

Figure 2:
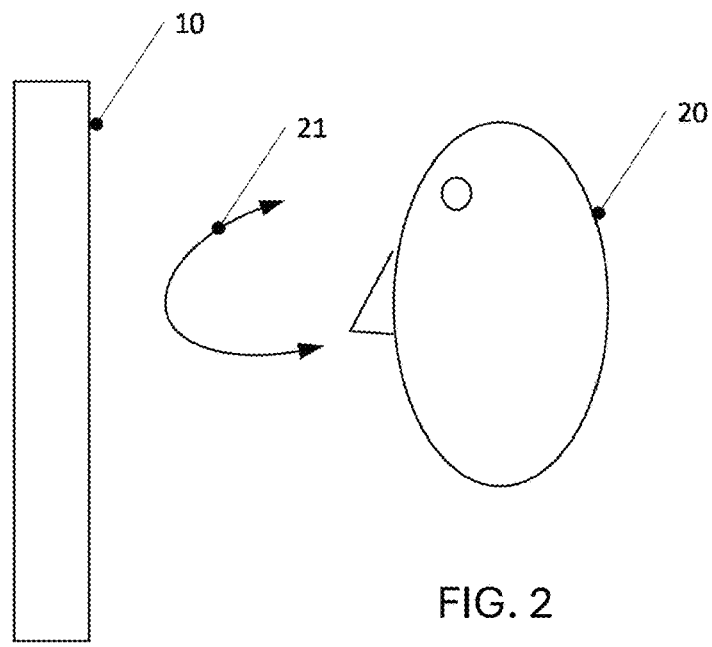
FIG. 2 is a diagram for illustrating capturing a plurality of combined images with the device of FIG. 1.

To generate a head model of a head of a person, for example for use as an avatar, first a plurality of combined depth and 2D images are taken from the head from a plurality of different positions of device 10 relative to the head. This is illustrated in FIG. 2, which shows a head 20, of which a model is to be generated.

Figure 3:
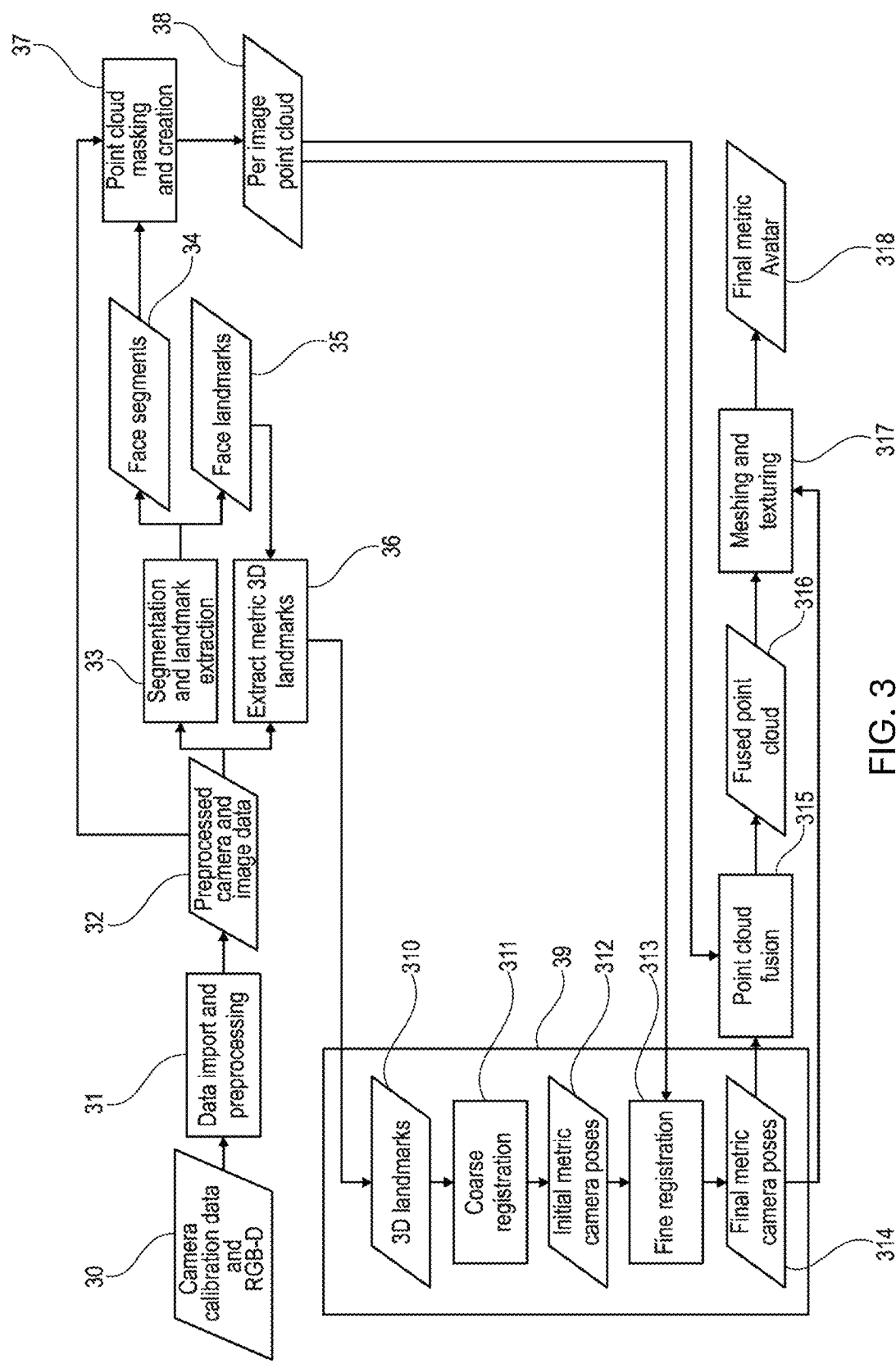
FIG. 3 is a flowchart illustrating a method for head model generation according to an exemplary embodiment.
Figure 4:
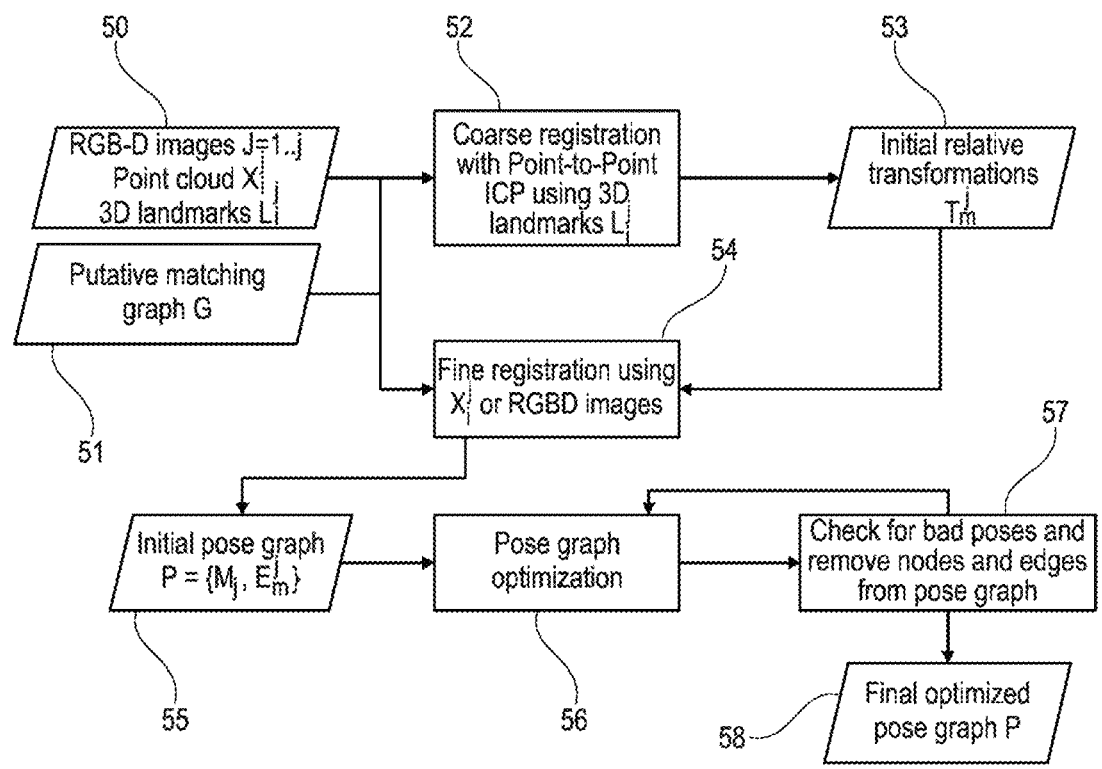
FIG. 4 is a flowchart illustrating registering of images according to an exemplary embodiment, used in step 39 of FIG. 3.

For image generation, device 10 outputs instruction to the person to move his or her head relative to device 10. For example, at start of the image recording, the person may look straight at device 10 such that a frontal image is captured, and then, as illustrated by an arrow 21, he/she may rotate his/her head first to the right and then to the left. An up and down movement is also possible. During this movement, device 10 records a plurality of combined 2D images (with camera 12) and depth images (with depth sensor 11). In other exemplary embodiments, instead of rotating head 20, device 10 may be moved around head 20. Based on the plurality of the thus-generated combined depth and 2D images, device 10, using processor 15, then generates a 3D model of head 20. FIG. 3 illustrates a method employed by device 10, and FIG. 4 illustrates a method of image registration which is one of the core aspects of the method of FIG. 3.

As input data 30, the method of FIG. 3 receives the 2D images recorded by camera 12 and the corresponding depth images recorded by depth sensor 11, i.e., the combined images (e.g., as RGB-D images). Furthermore, as input data the method uses intrinsic camera data, in particular smartphone camera calibration data for the method. Camera calibration data comprises information how an object is imaged by camera 12. As already mentioned initially, for a certain camera (certain image sensor, certain lens with a specific focal length) an object located at a certain position relative to the camera is imaged onto the image sensor in a manner determined by the camera. This information is determined by the physical properties of the cameras and possible built-in software image processing like rectification and can for example be provided by a manufacturer of the camera. The camera calibration information and correspondingly the preprocessed, e.g., downscaled camera calibration information 30 may be written in a matrix K, which translates a 3D point in real space $x_R, y_R, z_R$ (with a coordinate system relative to the camera) to a 2D image point x, y, i.e., $(x, y, 1) = K (x_R, y_R, z_R)^T$.

The input data is then preprocessed in step 31 to provide preprocessed camera and image data 32. For examples, in some smartphones and similar devices, depth sensor 11 may have a lower resolution than camera 12. Therefore, data preprocessing 31 provides downscaled images and correspondingly downscaled camera calibration information which have the same resolution as depth sensor 11. To give a simple numerical example, if the resolution of the original 2D images 31 is 4000×3000 pixels and the resolution of the depth images 37 is 400×300 pixels, the original images are also downscaled to 400×300 pixels such that the downscaled images also have a resolution of 400×300 pixels. Any resampling techniques conventionally used for downscaling may be used. The smartphone camera calibration information is downscaled accordingly, such that it now indicates how objects are recorded as downscaled images. Other preprocessing may for example include denoising or deblurring of images.

Figure 7:
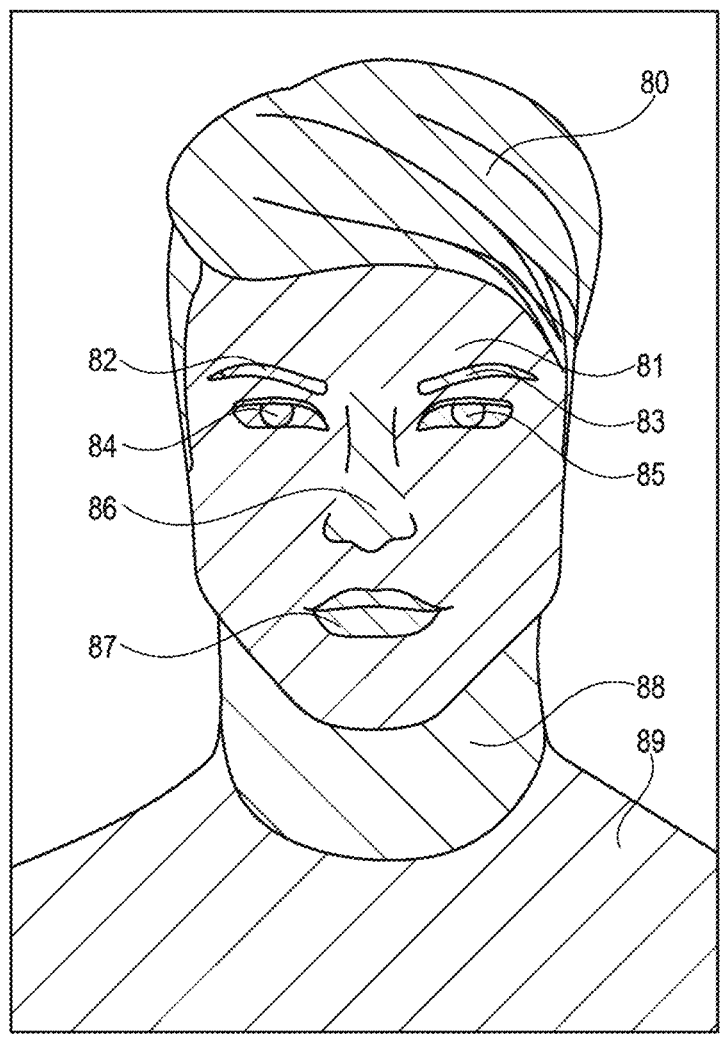
FIG. 7 illustrates an example for face segmentation.

At 33, the preprocessed image data 32 are processed to provide a segmentation and landmark extraction. For example, the background is separated from the face, and the face is segmented, to provide face segments 34. Any conventional face segmentation algorithm may be used. An example segmentation is shown in FIG. 7. Here, the background is separated from the person, and a segmentation is performed into hair 80, face 81, eyebrows 82, 83, eyes 84, 85, nose 86, mouth (with upper and lower lips) 87. Furthermore, neck 88 and shoulder region 89 are provided as separate regions.

Figures 6A, 6B:
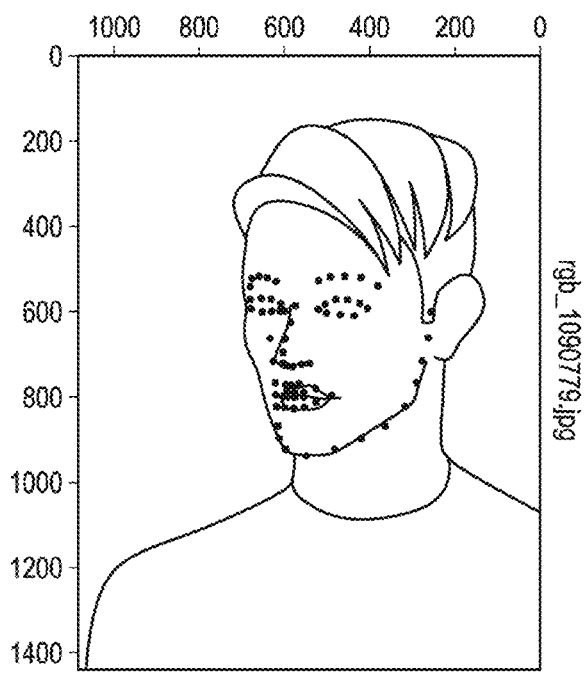
FIG. 6A shows an example of landmark points.
FIG. 6B shows an example of the landmark points as applied to a head.

Additionally, based on the downscaled images face landmarks are identified in the 2D images. For example, FIG. 6A illustrates a model using 68 points as landmarks, which in particular characterizes eyebrows, eyes, nose, mouth and lower edge of the face (including chin region). FIG. 6B illustrates the landmarks of FIG. 6A applied to a 2D image of a head of a person. Application of such landmarks is for example described in Guo, Jianzhu, et al. "Towards fast, accurate and stable 3D dense face alignment," arXiv preprint arXiv: 2009.09960 (2020).

The landmarks in the model of FIG. 6A also give a "pseudo-depth" information, which corresponds to a predetermined depth assigned to each landmark. In other words, the model regresses the 2D coordinates of each landmark in the 2D image as well as a pseudo-depth, which may be based on an average spatial relationship of the landmark points with each other (for example the tip of the nose protruding from the face etc.). The pseudo-depth is therefore comparatively inaccurate and only known up to scale, i.e., not in metric units, but in some arbitrary units, because the landmarks are regressed from a 2D image (i.e., the absolute metric scale is lost when transforming from the 3D object to a 2D image). However, based on the pseudo-depth it may be determined which landmarks are further away and which are closer to the camera at the time of capturing the image. In exemplary embodiments, based on the pseudo-depth a probability may be derived for each landmark if it is visible in a current image processed. For example, some landmark points might not be visible in the side views on the face (for example landmark points related to the right eye in a side view from the left side). Also in FIG. 6B some landmark points on the right side of the face are not visible. A probability $p_i$ of a landmark i=1 . . . . I, I being the number of landmarks, to be visible, i.e., a visibility probability, may be calculated according to $$p_i = 1 - \frac{d_i - d_{min}}{d_{max} - d_{min}}(1 - p_{min}),$$

where $p_{min}$ is an adjustable parameter, $d_i$ is the pseudo-depth of the i-th landmark, $d_{min}$ is the minimum pseudo-depth of the landmark points and $d_{max}$ is the maximum pseudo-depth of the landmark points. This landmark extraction at 33 therefore results in face landmarks 35 in the downscaled image provided with their pseudo-depth.

At 36, the method then comprises obtaining 3D landmark points 310 based on the 2D face landmarks 35 and the corresponding depth images (part of preprocessed data 32).

For obtaining the 3D landmarks at 36, based on the above probabilities only face landmark points with a probability exceeding a threshold are used. Based on the depth image, each of these 2D landmark points of face landmarks 35 is assigned a corresponding landmark depth $d_i^j$ where i the number of the landmark point and j is the image. The 3D point $L_i^j$ for the respective image j can then be derived according to $$L_i^j = K^{-1}(d_i^j [x_i^j, y_i^j, 1]^T)$$

where K is the above mentioned (downscaled) camera calibration information 30 written in matrix form as above and $[x_i^j, y_i^j, 1]$ is the 2D landmark coordinate (z-coordinate being set to 1) This results in the 3D landmark points 310 per image. These landmarks, due to the use of the depth images, now have a metric scale, i.e., their positions are not only known in arbitrary units, but in metric units.

Furthermore, at 37 point clouds are obtained for the face segments 34. In particular, using the face segments 34 the point clouds may be restricted to certain image regions, which may also be referred to as masking. For example, valid 3D points may be restricted to the head alone, excluding neck 88 and shoulder region 89 as well as the background in FIG. 7. In this way, the registration may be performed by turning the head while holding device 10 is essentially stationary (as depicted in FIG. 2). If shoulder region and background were included in such an analysis, these would remain fixed from image to image while only the head would turn, which would make registration at least significantly more difficult, if not impossible. In exemplary embodiments where device 10 is moved around the head to obtain the images, for example neck and shoulder region 88, 89 may be included. For the selected segments, a point cloud $X^j$ for each image is derived according to $$X_i^j = K^{-1}(d_i^j [x_i^j, y_i^j, 1]^T)$$

similar to what was explained for the 3D landmark points above. However, here the index i iterates all image points inside the valid mask region, for example the head region. $X_i^j$ for all i=1 . . . . I points forms a point cloud $X_i^j$ for image number J.

This results in a point cloud 38 for each image. Based on the 3D landmarks points 310 and the point clouds 38 then a two-step registration process 39 is carried out. As explained initially, performing a registration is equal to determining camera poses associated with the combined images.

This registration process 39 corresponds to the process already described above in more general terms. In brief, a coarse registration 311 based on the 3D landmark points 310 results in an approximate registration and therefore initial metric camera poses 312, These are then refined in a fine registration 313 using point clouds 38 to result in a final registration corresponding to final metric camera poses. The registration process will now be explained in more detail referring to FIG. 4.

As inputs, the registration process of FIG. 4 receives, at 50, the combined images (RGBD images), i.e., J images (corresponding to the RGBD images at 30 in FIG. 3), the point clouds $X_i^j$ (38 of FIG. 3) and the 3D landmarks $L_i^j$ (310 of FIG. 3). Furthermore, the registration process of FIG. 4 receives a putative matching graph G 51 as input. As explained above, the putative matching graph identifies potential matching pairs using approximate pose data, which may be given as metric data from the sensor itself, for example from ARKit or ARCore in the form of a head pose estimate, or can be derived from the facial landmarks (3D landmarks) via the 3D correspondences and the perspective n-point solver. Therefore, as also explained above, the images are classified in categories like left, right, up and down starting from a frontal image. Inside each category (left, right, up and down), a coarse registration at 52 (corresponding to 311 in FIG. 3) and a fine registration at 54 (corresponding to 313 of FIG. 3) is performed.

In the coarse registration at 52, the 3D landmarks $L_i^j$ are coarsely aligned between image pairs by point to point ICP, as mentioned above. Therefore, a transformation matrix $T_1^2$ from an image 1 to 2 is estimated that aligns the two landmark point clouds in a least-square sense, i.e., that the error $e = \|L_i^{j=1} - T_1^2 L_i^{j=2}\|^2$ is minimized. Also as mentioned, a random sample consensus procedure is applied. This results in initial relative transformations $T_m^j$ 53 between the image pairs.

These relative transformations 53 are then refined by a fine registration 54 using the point clouds $X_i^j$ or, as an alternative, the RGBD images (combined 2D and depth images), which also constitute a kind of point cloud. As also explained previously, depending on the position difference between the two images, RGBD odometry or point-to-plane ICP on the point clouds $X_i^j$ may be used to register the images. Furthermore, the registration may be performed two times, that is from a first image of an image pair to a second one and vice versa, corresponding to an estimation of $T_1^2$ and $T_2^1$. Based on the error between registrations, i.e., $$T_e = T_1^2 T_2^1 \equiv I_4$$

which should be close to an identity $I_4$, this relative transformation may be added to a pose graph to be generated as an edge between image 1 and 2, i.e., the transformation is added if the error is lower than a predefined threshold. Optionally, also a covariance matrix $\Sigma_1^2$ may be estimated for the registration quality. The covariance matrix contains information about the estimated precision of the ICP or RGBD odometry alignment. On the main diagonal of the covariance matrix the variance values for rotation (3 elements) and translation (3 elements) are provided, diag(var_r1, var_r2, var_r3, var_t1, var_t2, var_t3), where r1 to r3 are rotation values and t1 to t3 describe a translation vector. On the off diagonal elements co-variance values that would explain a correlation between different elements of the transformation may be provided. But the most important ones are usually the ones on the main diagonal.

This covariance matrix is then also added to the pose graph. The variance values could then be used to weight different transformation in a pose graph optimization described below. A large variance means more uncertainty. Such transformations then may be given less influence on pose graph optimization. For example, a weight may be assigned to an error for example with: 1/variance*error.

Figure 5:
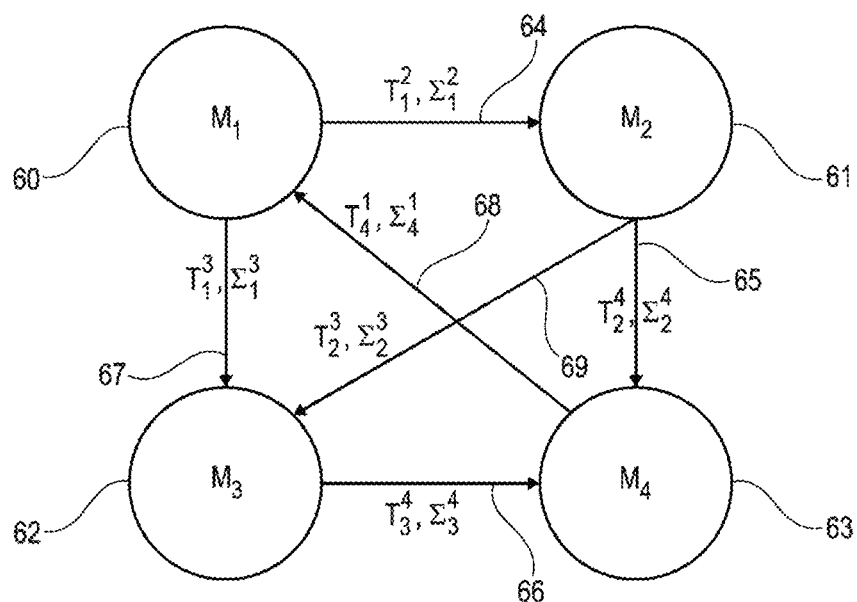
FIG. 5 shows an example of a pose graph for illustrating exemplary embodiments.

Based on the fine registration (optimized transformations through the fine registration), then an initial pose graph 55 is generated, with poses $M_j$ for each combined image (RGBD image) in a global reference system. As mentioned, such a pose graph optimization may be performed by conventional means, for example the method proposed in Choi, Sungioon et al cited above or using a state-of-the-art optimization library like the ceres-solver Agarwal, Sameer, and Keir Mierle and Others, "Ceres solver," available at the url ceres-solver. org (2015). For illustration, an example pose graph is shown in FIG. 5. As an example, the pose graph of FIG. 5 shows four nodes 60 to 63 corresponding to poses $M_1$ to $M_4$ for four images. For more images, the pose graph correspondingly would include more nodes. The nodes are linked by edges 64 to 69, each having assigned a corresponding transformation $T_i^j$ which transforms one pose to the other (for example $T_3^4$ of edge 66 transforms pose $M_3$ of node 62 to pose $M_4$ of node 63). If determined, each edge also has an assigned covariance $\Sigma_i^j$. Based on the initial pose graph 55, at 56 the method comprises performing a pose graph optimization e.g., as disclosed in Choi, Sungioon et al. For finding wrong edges, i.e., bad estimates of $T_i^j$, constituting a further optimization, at 57 a pruning step is performed. To this end, the optimized poses $M_j$ are compared to a pose obtained by walking along the edges of the unoptimized pose graph to a certain node along the shortest path in the graph, taking one of the poses as a reference. For example, taking $M_1$ as a reference (for example as $I_4$, the identity), $M_4$ may be estimated by odometry as $M_4^{odom} = T_1^2 * T_2^4$, and compared to optimized $M_4$ of graph 63, walking along edges 64, 65. In $M_4^{odom} M_4^{-1}$ should in this case be close to the identity matrix 14. Slight differences may exist as pose $M_4$ was optimized by the above-mentioned pose graph optimization at 56. However, if the deviation from the identity matrix 14 is more than a predefined threshold, this indicates bad edges and possibly nodes, which may be removed at 57. After this, the pose graph optimization at 56 may be repeated. In many cases, one iteration is sufficient.

The result is then a final optimized pose graph P 58.

This optimized pose graph in FIG. 3 corresponds to the final metric camera poses 314 of FIG. 3. As mentioned, the poses of the pose graph are immediately linked to the poses of device 10 and therefore to the camera poses when capturing the images.

Based on the metric poses 314 and the point clouds 38, at 315 the method of FIG. 3 includes a fusing of the point clouds $X_i^j$ to a final point cloud $X_{fused}$, e.g., by transforming each single point cloud into a common reference system according to $$X_{fused} = U_{j=1}^J M_j X_i^j.$$

This fused point clouds may be thinned out by keeping only one point per voxel with a predefined side length v, for example v=1 mm. Also other fusion methods may be used like view based methods like disclosed in S. Galliani, K. Lasinger and K. Schindler, Massively Parallel Multiview Stereopsis by Surface Normal Diffusion, ICCV 2015 or machine learning based methods like Choe, Jaesung, et al. "VolumeFusion: Deep Depth Fusion for 3D Scene Reconstruction," arXiv preprint arXiv: 2108.08623 (2021).

Based on the fused point cloud 316, then at 317 a metric 3D model of the head 318 is generated which may be used as an avatar.

In step 317, the method includes calculating a mesh based on the fused point cloud, using Poisson reconstruction as discussed above. Due to noise, the mesh might have some uneven surface elements. To reduce this effect, the mesh may be smoothed for one or more iterations using Laplacian or Taubin smoothing. Furthermore, to clean up the mesh and remove unwanted artifacts, connected components are extracted and only the largest one are kept, resulting in a cleaned mesh corresponding to the final geometry of the model. This means that small disconnected meshes which may be "floating around" are discarded. Such disconnected meshes may for example be due to thin hair of the person not close enough to the head to be connected. The mesh may be transformed to a standard sized world coordinate system, (for example with z-axis pointing upward).

To finally generate the 3D model of the head 318, at 317 the cleaned mesh in the world coordinate system is provided with a texture. The eye regions are textured from a center image, to avoid providing a texture related to eyes taken from different views. For texturing, as mentioned above the approach discussed in Waechter, Michael et al. cited above may be used. To find the center image, for example the face segment shown in FIG. 7 may be analyzed, and the one with the largest eye segments 84, 85 for both left and right eye may be taken as the center image.

The thus created 3D model may then be used as an avatar for example for virtual try-on of spectacle frames, determining centration parameters for spectacle frames and the like.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method for head image registration, comprising:
providing a plurality of combined 2D and depth images of a head captured from different positions;
determining landmark points which are predefined points on the head for each of the combined 2D and depth images; and
performing a pairwise coarse registration between pairs of combined 2D and depth images based on the landmark points,
wherein the method further comprises:
after the pairwise coarse registration, performing a fine registration of the coarse registered combined 2D and depth images based on full point clouds represented by the combined 2D and depth images,
wherein the fine registration is performed selectively based on odometry or point to plane ICP (iterative closest point), depending on a geometrical difference between the combined 2D and depth images of the respective pair after the coarse registration, and
wherein determining the landmark points comprises determining a visibility probability of the landmark points based on a predetermined depth assigned to each landmark point and the 2D images of the combined 2D images;
selecting landmark points based on the visibility probability; and
providing 3D landmark points for the selected landmark points based on the combined 2D and depth images.

2. The method of claim 1, further comprising determining the pairs for the pairwise coarse registration based on a classification of the combined 2D and depth images with respect to a direction relative to the head from which they are captured.

3. The method of claim 1, further comprising, after the coarse registration, generating a pose graph based on the fine registration.

4. The method of claim 3, further comprising pruning the pose graph to remove incorrect edges of the pose graph.

5. The method of claim 4, wherein the pruning comprises optimizing the pose graph, and comparing a pose of an optimized pose graph with an odometry based pose generated based on one or more edges of the pose graph.

6. The method of claim 1, wherein the method is performed with a device comprising a 2D image sensor and a depth sensor selected from the group consisting of a smartphone and a tablet PC.

7. A method for head model generation, comprising:
performing the method for head image registration of claim 1; and
generating the head model based on the registration.

8. The method of claim 7, further comprising determining camera poses based on the registration, and generating the head model based on the camera poses.

9. The method of claim 7, wherein generating the head model comprises:
generating a fused point cloud based on the plurality of combined 2D and depth images and the registration;
generating a mesh based on the fused point cloud; and
adding texture to the mesh based on the 2D images of the combined 2D and depth images.

10. A computer program stored on a non-transitory storage medium for a mobile device including a processor, a 2D camera, and a depth sensor, wherein the computer program, when run on the processor, causes execution of the method of claim 1.

11. A device, comprising a processor configured to:
receive a plurality of combined 2D and depth images of a head captured from different positions;
determine landmark points which are predefined points on the head for each of the combined 2D and depth images; and
perform a pairwise coarse registration between pairs of combined 2D and depth images based on the landmark points,
wherein the processor is further configured to:
after the coarse registration, perform a fine registration of the coarse registered combined 2D and depth images based on full point clouds represented by the combined 2D and depth images,
wherein the fine registration is performed selectively based on odometry or point to plane ICP (iterative closest point), depending on a geometrical difference between the combined 2D and depth images of the respective pair after the coarse registration, and
wherein determining the landmark points comprises determining a visibility probability of the landmark points based on a predetermined depth assigned to each landmark point and the 2D images of the combined 2D images;
selecting landmark points based on the visibility probability; and
providing 3D landmark points for the selected landmark points based on the combined 2D and depth images.

12. The device of claim 11, wherein the device further comprises a camera and a depth sensor configured to capture the combined 2D and depth images.

13. The device of claim 11, wherein the device is configured to perform the method of claim 2.

* * * * *

UNITED STATES PATENT AND TRADEMARK OFFICE
CERTIFICATE OF CORRECTION

| | | |
|---|---|---|
| PATENT NO. | : 12,236,621 B2 | Page 1 of 1 |
| APPLICATION NO. | : 18/798862 | |
| DATED | : February 25, 2025 | |
| INVENTOR(S) | : Steffen Urban and Christian Achilles | |

It is certified that error appears in the above-identified patent and that said Letters Patent is hereby corrected as shown below:

In the Specification

In Column 5, Line 10: change "Mckay" to -- McKay --

In Column 5, Line 61: change "Jacsik" to -- Jaesik --

In Column 6, Line 36: change "eyep" to -- eye --

In Column 7, Lines 3 to 4: change "scenes, proceedings" to -- scenes," Proceedings --

Signed and Sealed this
Seventh Day of October, 2025

John A. Squires
*Director of the United States Patent and Trademark Office*